(12) United States Patent
Luo et al.

(10) Patent No.: US 8,191,237 B1
(45) Date of Patent: Jun. 5, 2012

(54) METHOD FOR PROVIDING A STRUCTURE IN A MAGNETIC TRANSDUCER

(75) Inventors: Guanghong Luo, Fremont, CA (US); Ge Yi, Pleasanton, CA (US); Dujiang Wan, Fremont, CA (US); Lei Wang, Fremont, CA (US); Xiaohai Xiang, Danville, CA (US); Ming Jiang, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 463 days.

(21) Appl. No.: 12/470,385

(22) Filed: May 21, 2009

(51) Int. Cl.
*G11B 5/127* (2006.01)
*H04R 31/00* (2006.01)

(52) U.S. Cl. ............... 29/603.16; 29/603.13; 29/603.14; 29/603.15; 29/603.18; 360/121; 360/122; 360/317; 451/5; 451/41

(58) Field of Classification Search ............... 29/603.07, 29/603.13–603.16, 603.18; 360/121, 122, 360/317; 451/5, 41
See application file for complete search history.

(56) References Cited

U.S. PATENT DOCUMENTS

| | | | |
|---|---|---|---|
| 5,618,381 A | 4/1997 | Doan et al. | |
| 5,928,959 A | 7/1999 | Huckels et al. | |
| 6,004,653 A | 12/1999 | Lee | |
| 6,251,788 B1 | 6/2001 | Liou | |
| 6,328,859 B1 | 12/2001 | Hsiao et al. | |
| 6,383,935 B1 | 5/2002 | Lin et al. | |
| 6,391,780 B1 | 5/2002 | Shih et al. | |
| 6,630,390 B2 | 10/2003 | Andideh et al. | |
| 6,821,899 B2 | 11/2004 | Lohokare et al. | |
| 6,939,796 B2 | 9/2005 | Lohokare et al. | |
| 7,139,153 B2 | 11/2006 | Hsiao et al. | |
| 7,217,649 B2 | 5/2007 | Bailey, III et al. | |
| 7,248,434 B2 | 7/2007 | Dill et al. | |
| 7,296,339 B1 * | 11/2007 | Yang et al. | 29/603.16 |
| 7,552,523 B1 * | 6/2009 | He et al. | 29/603.16 |
| 2006/0044681 A1 | 3/2006 | Le et al. | |
| 2006/0174474 A1 | 8/2006 | Le | |
| 2006/0288565 A1 | 12/2006 | Le et al. | |
| 2007/0115584 A1 | 5/2007 | Balamane et al. | |
| 2007/0245544 A1 | 10/2007 | Allen et al. | |
| 2008/0148552 A1 | 6/2008 | Pentek et al. | |
| 2008/0151437 A1 | 6/2008 | Chen et al. | |
| 2008/0244896 A1 | 10/2008 | Bonhote et al. | |

* cited by examiner

*Primary Examiner* — Paul D Kim (57) ABSTRACT

A method for providing a structure in a magnetic transducer is described. The method includes performing a first planarization that exposes a top surface of the magnetic transducer. This first planarization also terminates before a portion of a first planarization buffer layer is removed. The method also includes providing a second planarization buffer layer after the first planarization is performed. The second planarization buffer layer is above the first planarization buffer layer. The method also includes performing a second planarization. This second planarization does not completely remove the second planarization buffer layer. The method also includes performing a third planarization terminating after the first planarization buffer layer is exposed and before the first planarization buffer layer is completely removed.

16 Claims, 10 Drawing Sheets

METHOD FOR PROVIDING A STRUCTURE IN A MAGNETIC TRANSDUCER

BACKGROUND

Figure 1:
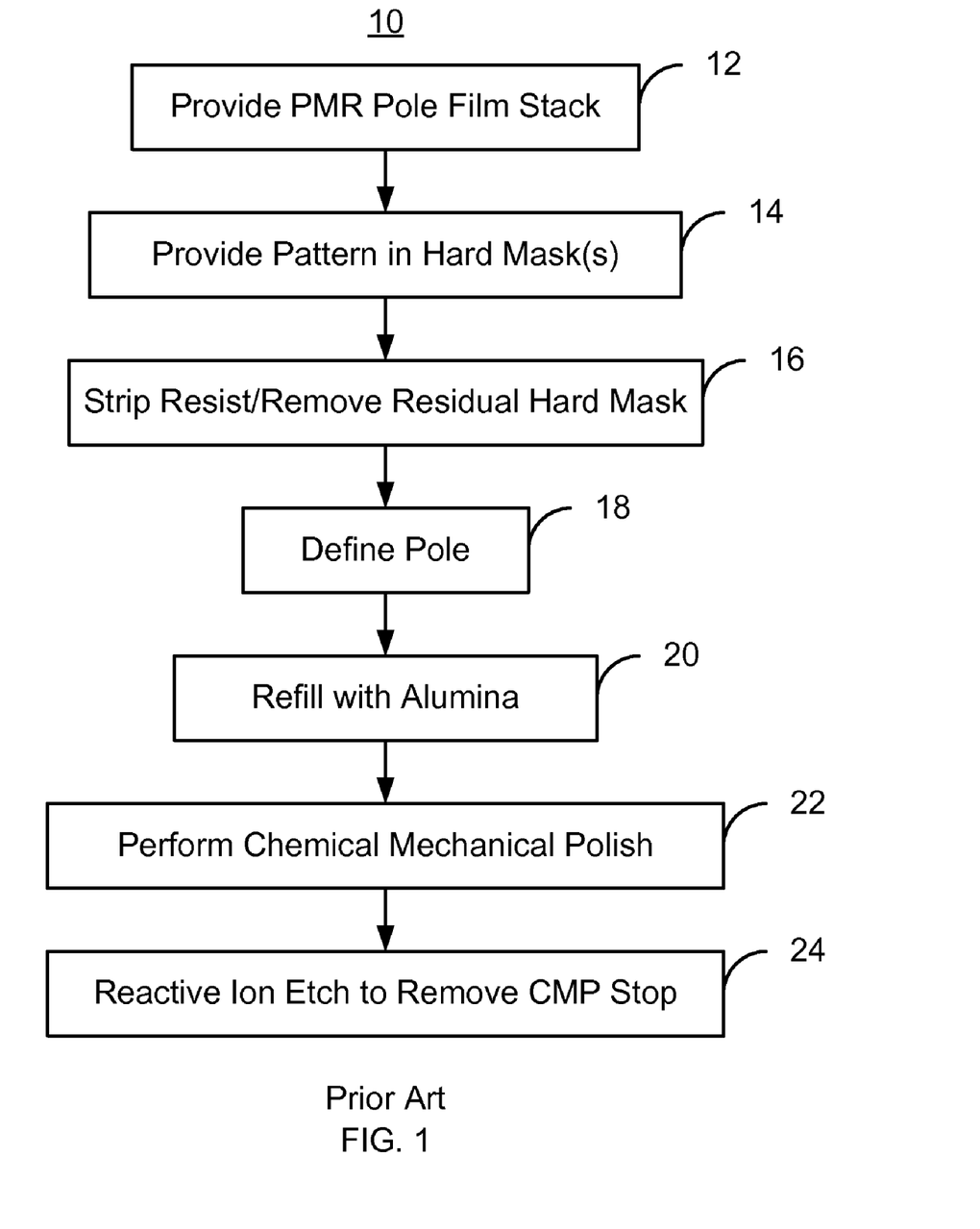
FIG. 1 is a flow chart depicting a conventional method for fabricating a PMR head.

FIG. 1 is a flow chart depicting a conventional method 10 for fabricating a conventional perpendicular magnetic recording (PMR) transducer. For simplicity, some steps are omitted. The conventional method 10 is used for providing a PMR pole. The film stack for the pole is deposited, via step 12. Step 12 generally includes depositing seed layer(s), high moment magnetic film(s), a chemical mechanical planarization (CMP) stop layer, and one or more hard mask layers. A pattern in the hard mask layer(s) is provided, via step 14. Step 14 may include providing a photoresist mask and transferring the pattern of the photoresist mask to the hard mask layer(s). The photoresist mask pattern may be transferred by ion milling. The pole is then defined from the high moment magnetic layers, via step 18. Step 18 may also be performed by ion milling through the high moment magnetic layers. The PMR pole formed has a negative angle, with its top being wider than its bottom. The transducer is then refilled with alumina, via step 20. Thus, the regions around the pole may be filled. However, the top surface of the transducer may not be even. Consequently, a CMP may be performed, via step 22. The CMP typically terminates when at least a portion of the CMP stop layer remains. Thus, the top surface of the transducer is planarized. The CMP stop layer is then removed, for example using a reactive ion etch (RIE). Fabrication of the magnetic transducer may then be completed.

Although the conventional method functions, there are inconsistencies in fabrication of the transducer. These inconsistencies may adversely affect both the yield of the conventional method 10 and the performance of poles formed using the conventional method 10. For example, the CMP may result in dishing and/or similar nonuniformities. As a result, the top surface of the transducer may not be as flat as desired. Formation of subsequent structures, such as shields, may be adversely affected. Performance of the transducer provided and yield of the method 10 may thus be affected.

Accordingly, what is needed is an improved method for fabricating a PMR transducer.

SUMMARY

A method and system for providing a structure in a magnetic transducer are described. The transducer also includes an additional structure distal from the structure, a first planarization buffer layer, and an intermediate layer. A first portion of the first planarization buffer layer resides on the structure. A second portion of the first planarization buffer layer resides on the additional structure. A first portion of the intermediate layer resides between the structure and the additional structure. A second portion of the intermediate layer resides above the structure. The method and system include performing a first planarization that exposes a top surface of the magnetic transducer and terminates before a portion of the first planarization buffer layer is removed. The method and system also include providing a second planarization buffer layer having a top and residing above the first planarization buffer layer. The second planarization buffer layer is provided after the first planarization is terminated. A second planarization is performed. The second planarization terminates before the second planarization buffer layer is completely removed. The method and system also include performing a third planarization terminating after the first planarization buffer layer is exposed and before the first planarization buffer layer is completely removed.

DETAILED DESCRIPTION OF THE PREFERRED EMBODIMENTS

Figure 2:
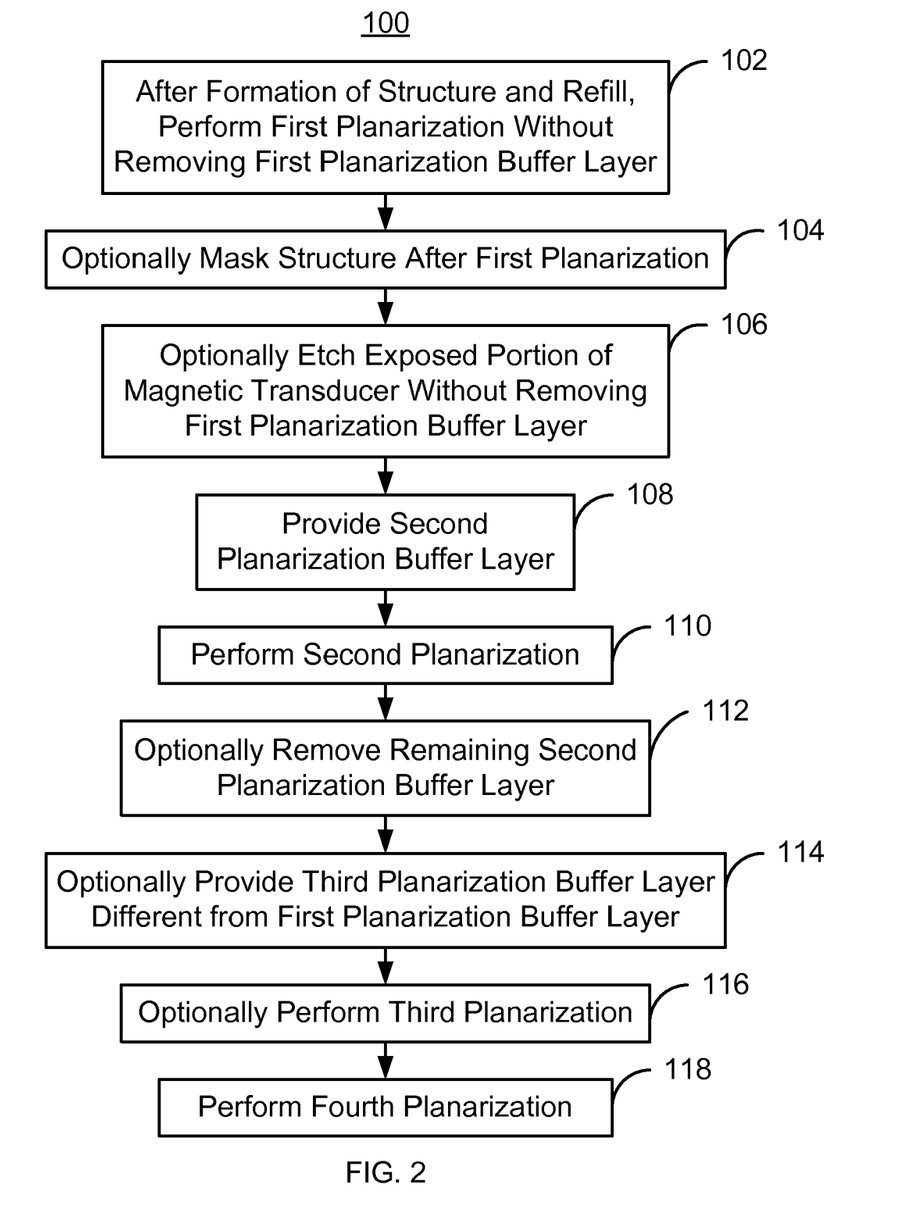
FIG. 2 is a flow chart depicting an exemplary embodiment of a method for fabricating a structure in a magnetic transducer.

FIG. 2 is a flow chart depicting an exemplary embodiment of a method 100 for fabricating a structure for a magnetic recording transducer. The structure described may include a PMR pole. However, other structures may also be fabricated. For simplicity, some steps may be omitted. The transducer being fabricated may be part of a merged head that includes read and write head and resides on a slider in a disk drive. The method 100 also may commence after formation of other portions of the transducer. The method 100 is also described in the context of providing a single structure in a single magnetic recording transducer. However, the method 100 may be used to fabricate multiple structure and/or multiple transducers at substantially the same time. The method 100 and system are also described in the context of particular layers. However, in some embodiments, such layers may include multiple sub-layers.

In one embodiment, the method 100 commences after formation of some structures in the transducer have been fabricated. For example, in one embodiment, the method 100 starts after the structure has been defined. For example, for a PMR pole, a PMR pole stack including magnetic materials and a first planarization buffer layer is deposited and the PMR pole defined from the stack. A planarization buffer layer is one which slows or stops the planarization. Stated differently, the layer is more difficult to remove using the planarization step. As a result, both the PMR pole and an additional structure distal from the PMR pole would be formed prior to the method 100 starting. In one embodiment, this additional structure is a CMP or other planarization support structure. In one embodiment, the first planarization buffer layer has a thickness of at least thirty and not more than fifty nanometers. In another embodiment, the first planarization buffer layer may be thinner, for example as thin as ten nanometers. In addition to the magnetic materials and a first planarization buffer layer, one or more hard mask layers may be part of the stack. The method 100 may also start after component(s) other than the structure have been formed. For example, an intermediate layer, such as aluminum oxide, may also have been provided. The intermediate layer may cover the structure, reside between the structure and the additional structures, and reside on top of the additional structure(s). Thus, the structure/PMR pole and additional structure may both reside under portions of the intermediate layer. However, the top surface of the transducer would have a topology that reflects the discontinuity of underlying layers instead of being flat.

A first planarization is performed, via step 102. The first planarization exposes a new top surface of the magnetic transducer and terminates before the first planarization buffer layer is removed. In one embodiment, first planarization removes part of the intermediate layer and ensures that the top surface is more uniform and substantially flat. This planarization may be a CMP configured to planarized aluminum oxide.

A mask that covers the structure is optionally provided, via step 104. The bottom of the mask would be on the top surface of the magnetic transducer that was exposed in step 102. In addition, the mask would expose part of the transducer including the additional structure(s). The exposed portion of the magnetic transducer is optionally etched, via step 106. The etch removes part of the intermediate and other layer(s), but does not remove the first planarization buffer layer. However, in another embodiment, steps 104 and 106 may be performed in a different manner or might be omitted.

A second planarization buffer layer is provided, via step 106. A planarization buffer layer is a layer which slows or stops a planarization step. For example, the second planarization buffer layer might include diamond-like carbon (DLC), silicon carbide, Ru, and/or Cr where the second planarization (described below) is a CMP step. The second planarization buffer layer may also be configured to be removable using a different process than the first planarization buffer layer. For example, if both the first and second planarization buffer layers are for CMPs, one of the buffer layers may be silicon carbide while the other is DLC.

The second planarization buffer layer is on the additional structure(s), but not on the structure. The thickness of the second planarization buffer layer is also set based on the first planarization buffer layer. For example, suppose the first planarization buffer layer has a first thickness, the second planarization buffer layer has a second thickness, and the intermediate layer has a third thickness. The second thickness of the second planarization buffer layer is greater than the first thickness of the first planarization buffer layer and less than the third thickness of the intermediate layer. In one such embodiment, the second planarization buffer layer has a thickness of at least fifty and not more than one hundred fifty nanometers. Thus, the portion of the second planarization buffer layer on the additional structure is below the bottom of the mask. The mask may also be removed in step 106 after deposition of the second planarization buffer layer. After the second planarization buffer layer is provided and the mask removed, the portion of the transducer above the structure would protrude slightly beyond the second planarization buffer layer.

A second planarization is performed, via step 110. The second planarization terminates before the second planarization buffer layer is completely removed. Thus, the top surface of the transducer is, again, substantially flat. However, the remaining part of the second planarization buffer layer around the structure may protrude slightly.

A remaining portion of the second planarization buffer layer may optionally be removed after the second planarization is terminated, via step 112. The second planarization buffer layer is removed in step 112 substantially without removing any portion of the first planarization buffer layer. For example, a RIE with a chemistry appropriate for the second planarization buffer layer may be performed in step 112. In such an embodiment, the first planarization buffer layer may be removable by another RIE using a different chemistry. If a third planarization stop layer is to be used, then step 114 may include providing a mask covering the structure and exposing the additional structure, then performing the RIE. In another embodiment, step 112 may be omitted.

A third planarization buffer layer may optionally be provided in step 114. The third planarization buffer layer would be below the top of the remaining intermediate layer on the structure. The third planarization buffer layer is also desired to be thinner than the second planarization buffer layer and thicker than the first planarization buffer layer. Thus, the portion of the transducer above the structure may protrude slightly. However, it protrudes less than after step 108. In another embodiment, step 114 may be omitted.

A third planarization is optionally performed, via step 116. The third planarization is terminated before the third planarization buffer layer is completely removed. In one embodiment, step 116 also includes removing any remaining third planarization buffer layer. In another embodiment, step 116 may be omitted.

A fourth planarization is performed, via step 118. In one embodiment, step 118 includes performing a CMP. The fourth planarization terminates after the first planarization buffer layer is exposed and before the first planarization buffer layer is completely removed. The first planarization buffer layer may be thinner than the second and third planarization buffer layers. Thus, the fourth planarization may be designed to remove only a small portion of the transducer. A touch planarization may thus be used in step 118. Stated differently, the fourth planarization may be short in duration, use a dilute slurry, and/or a lower pressure.

Using the method 100, the transducer having a flat top surface may be formed around the structure. The variations in the top surface may be reduced over that of the conventional method 10 described in FIG. 1. Better control of the topology of the transducer, as well as subsequent structures, may thus be achieved. Yield may likewise be improved. Further, although four planarizations and three buffer are described, another number of planarizations and another number of planarization buffer layers may be used. The process of thinner protrusions and buffer layers and lighter planarizations may relatively simply and easily improve the uniformity of the device being provided. Thus, yield, performance and uniformity may be improved.

Figure 3:
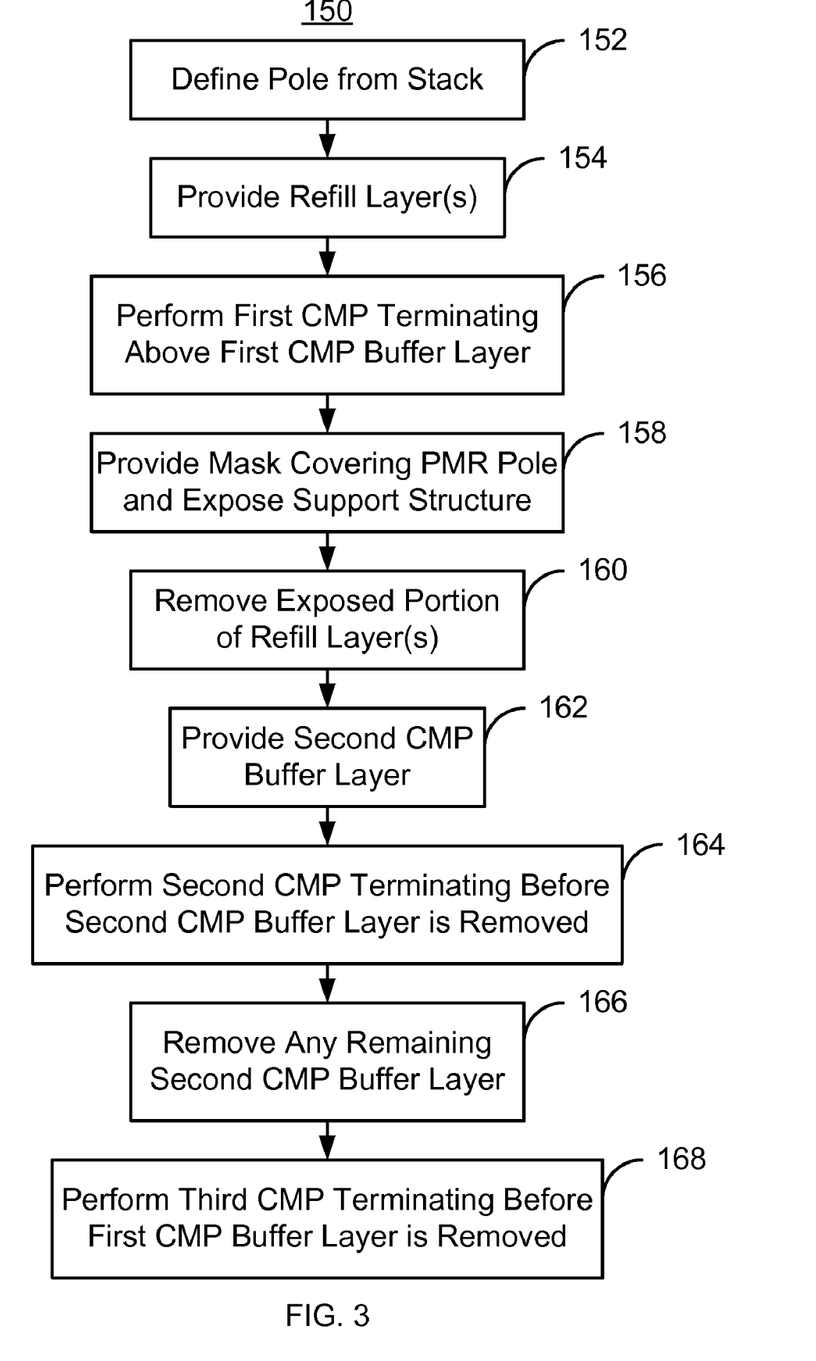
FIG. 3 is a flow chart depicting another embodiment of a method for fabricating a PMR transducer.

FIG. 3 is a flow chart depicting an exemplary embodiment of a method 150 for fabricating a PMR pole for a magnetic recording transducer. The method 150 is analogous to the method 100. Thus, in the method 150, the structure being fabricated is a PMR pole. For simplicity, some steps may be omitted. FIGS. 4-12 are diagrams depicting an exemplary embodiment of a perpendicular magnetic recording transducer 200 during fabrication. For clarity, FIGS. 4-12 are not to scale. Referring to FIGS. 3-12, the method 150 is described in the context of the PMR transducer 200. The PMR transducer 200 being fabricated may be part of a merged head that also includes read transducer and resides on a slider in a disk drive. The method 150 also may commence after formation of other portions of the PMR transducer 200. The method 150 is also described in the context of providing a single PMR pole in a single magnetic recording transducer. However, the method 150 may be used to fabricate multiple PMR poles and/or multiple transducers at substantially the same time. The method 150 and system are also described in the context of particular layers. However, in some embodiments, such layers may include multiple sub-layers.

In one embodiment, the method 150 commences after formation of some structures in the transducer have been fabricated. For example, in one embodiment, the method 150 starts after the PMR pole stack including magnetic materials and a first planarization buffer layer has been deposited. In one embodiment, the first planarization buffer layer is on the order of fifty nanometers or less in thickness. In one such embodiment, the first planarization buffer layer is at least thirty nanometers thick.

Figure 4:
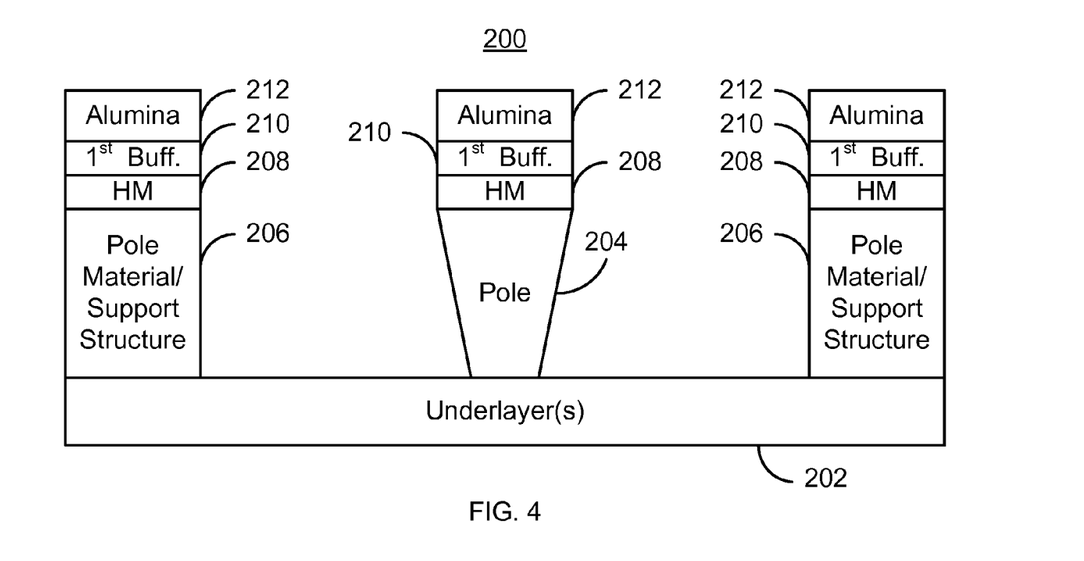
FIGS. 4-12 are diagrams depicting an exemplary embodiment of a perpendicular magnetic recording transducer during fabrication.

The PMR pole defined from the stack, via step 152. Step 152 may be performed by ion milling the PMR transducer with the hard mask(s) and any other mask(s) desired, in place. FIG. 4 depicts the PMR transducer after step 152 is performed. Consequently, the PMR pole 204 and support structures 206 are shown on the underlayer 202. In one embodiment, the distance between the support structures 206 and the edges of the PMR pole 204 may be at least three times the height of the PMR pole 204. For example, in one embodiment, the PMR pole 204 is 0.3 micrometers thick. Thus, the support structures 206 may be spaced approximately one micrometer from the PMR pole 204. The hard mask(s) 208 are shown. In addition, the first planarization buffer layer 210, which was deposited as part of the stack, is shown. The first planarization buffer layer is also desired to be thin. Thus, in one embodiment, the first planarization buffer layer 210 may be not more than fifty nanometers in thickness. A top, nonmagnetic layer, shown in FIG. 4 as alumina 212, is also present. Both the PMR pole 204 and additional structures 206 distal from the PMR pole 204 are formed.

Figure 5:
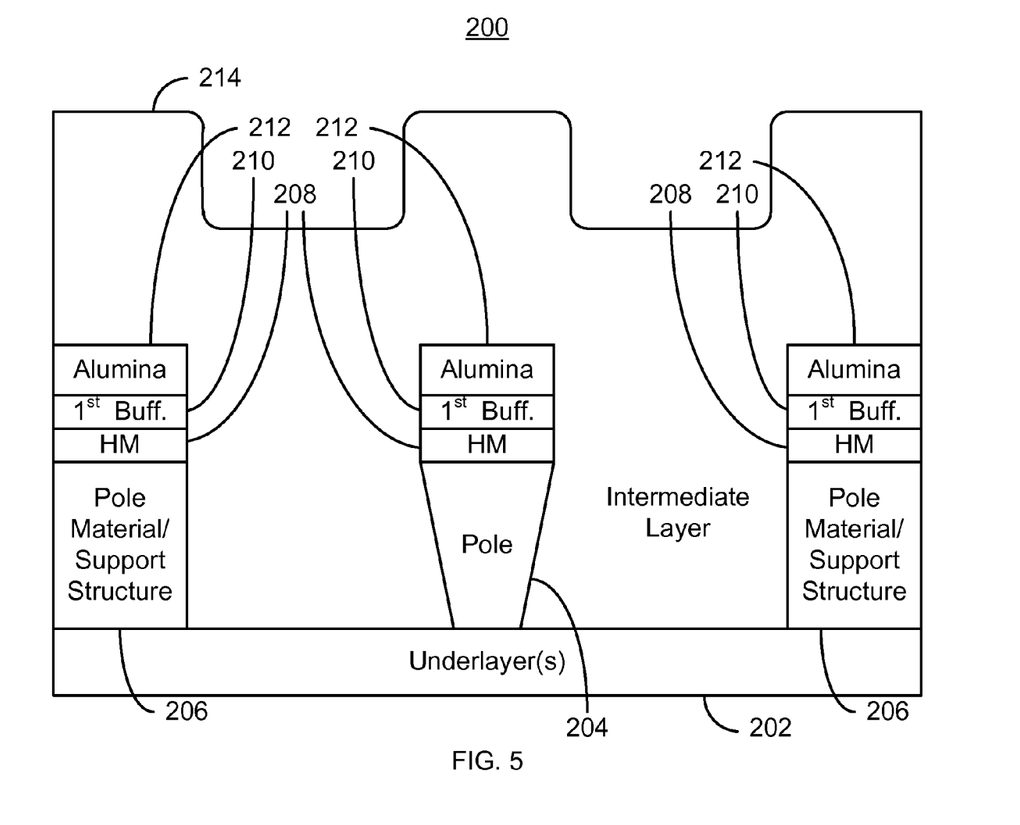

The intermediate, or refill, layer(s) are provided, via step 154. Step 154 may thus include depositing alumina and/or other nonmagnetic layers to refill the regions around the PMR pole 204. FIG. 5 depicts the PMR transducer 200 after step 154 is performed. Consequently, the intermediate layer 214 is shown. The intermediate layer 214 resides not only on the PMR pole 204 and support structures 206, but also in the region between the PMR pole 204 and support structures 206. The intermediate layer 214 is thicker than the combination of the PMR pole 204 and additional structures 208, 210, and 212. The intermediate layer 214 may be at least one and not more than ten micrometers thick. In one such embodiment, the intermediate layer 214 is at least five micrometers thick.

Figure 6:
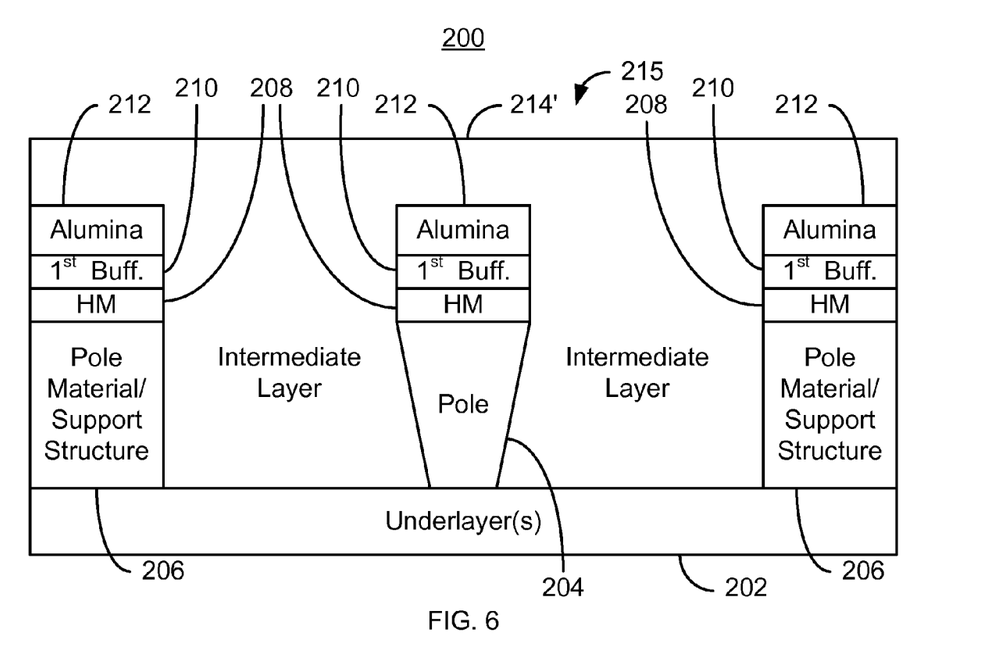

A first CMP is performed, via step 156. This planarization may be a CMP configured to planarized aluminum oxide. The first planarization exposes a new, top surface of the PMR transducer 200 and terminates before the first planarization buffer layer 210 is removed. FIG. 6 depicts the PMR transducer 200 after step 156 is performed. The first planarization has thus removed part of the intermediate layer 214. The remaining portion of the intermediate layer 214' has a newly exposed top surface 215 that is uniform and substantially flat.

Figure 7:
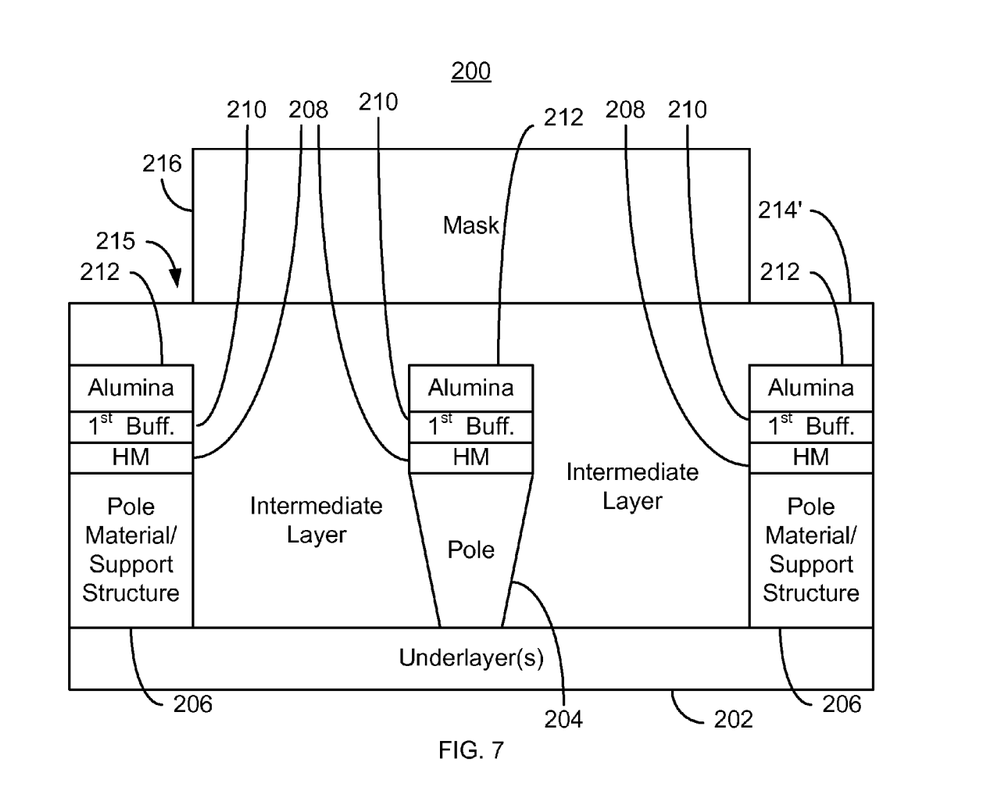

A mask that covers the PMR pole 204 is provided, via step 158. The support structures 206 are, however, exposed. In one embodiment, the mask provided in step 158 is a photoresist mask. FIG. 7 depicts the PMR transducer 200 after step 158 is performed. The mask 216 is thus shown. The bottom of the mask 216 is on the top surface 215 of the magnetic transducer that was exposed in step 158. The mask 216 covers not only the PMR pole 204, but also at least part of the region between the PMR pole 204 and the support structures 206. The mask 216, however, exposes part of the transducer including the additional/support structure(s) 206.

The exposed portion of the intermediate layer 214' is etched, via step 160. The etch removes part of the intermediate and other layer(s), but does not remove the first planarization buffer layer 208. In one embodiment, step 160 includes performing an aluminum oxide RIE. Thus, the remaining intermediate layer 214' in exposed regions above the support structure 206 is thinner than the portion of the intermediate layer 214' under the mask 216.

A second planarization buffer layer is provided, via step 162. For example, step 162 may include depositing one or more of DLC, silicon carbide, Ru, and Cr. The second planarization buffer layer may also be configured to be removable using a different process than the first planarization buffer layer. For example, if the first planarization buffer layer is silicon carbide the second planarization buffer layer may be DLC. The mask may also be removed in step 162. For example, a lift-off may be performed.

Figure 8:
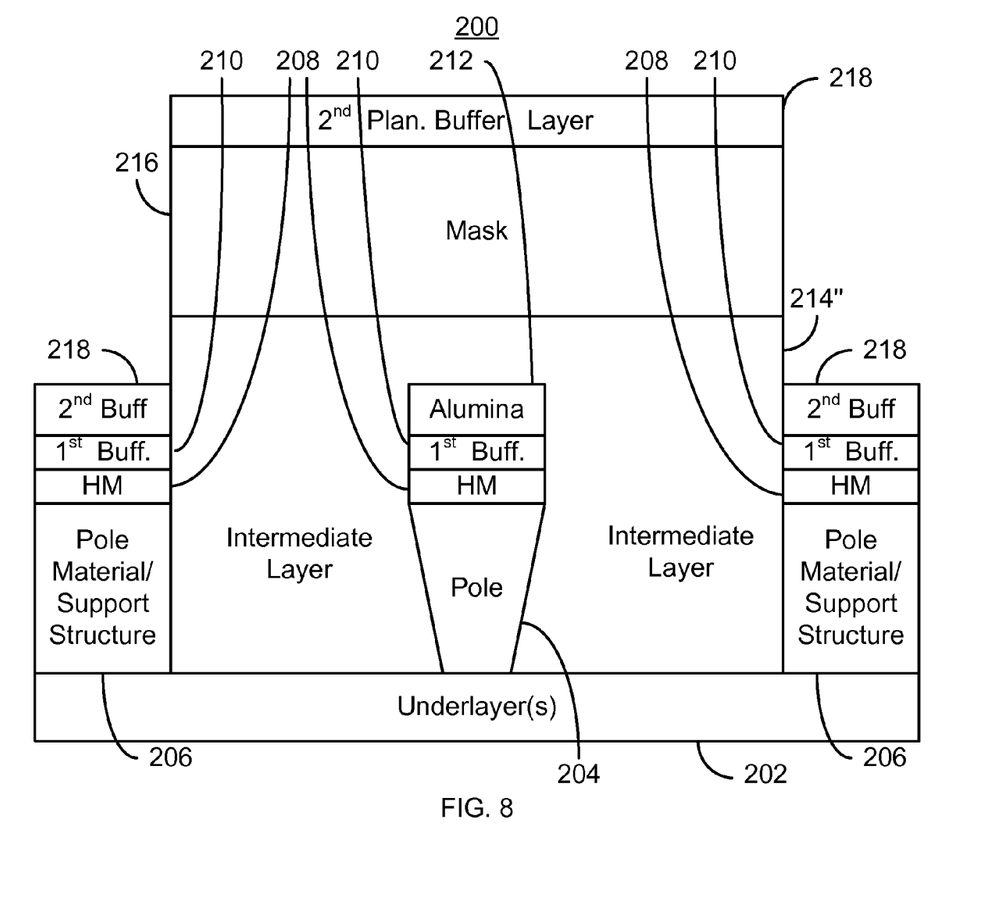

FIG. 8 depicts the PMR transducer 200 after step 160 has been performed and the second planarization buffer layer has been deposited in step 162. Thus, the remaining portion of the intermediate layer 214" is beneath the mask 216. The rest of the intermediate layer 214" has been removed. In addition, the alumina layer 212 (not shown) has been removed from the exposed portions of the PMR transducer. The second planarization buffer layer 218 has been provided. Because of the presence of the mask 216, the second planarization buffer layer 218 resides above the support structure. In addition, the second planarization buffer layer 218 has its thickness set such that the top of the second planarization buffer layer 218 is below the bottom of the mask 216 and thus below the top of the intermediate layer 214". In one embodiment, the second planarization buffer layer 218 has a thickness of at least ten and not more than one hundred fifty nanometers. In one such embodiment, the thickness of the second planarization buffer layer 218 is at least fifty nanometers and not more than one hundred and fifty nanometers.

Figure 9:
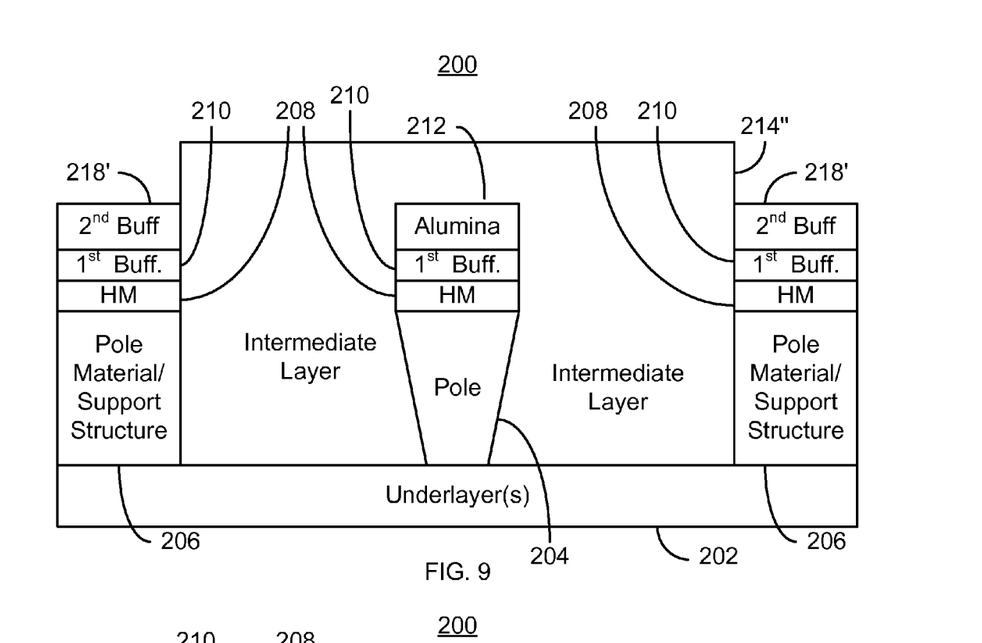

FIG. 9 depicts the transducer 200 after step 162 is completed and the mask 216 has been removed. Thus, only the portion of the second planarization buffer layer 218' on the support structures 206 remains. Because the second planarization buffer layer 218' is sufficiently thin, the portion of the transducer 200 that was under the mask 216 (not shown in FIG. 9) protrudes slightly beyond the second planarization buffer layer 218"

Figure 10:
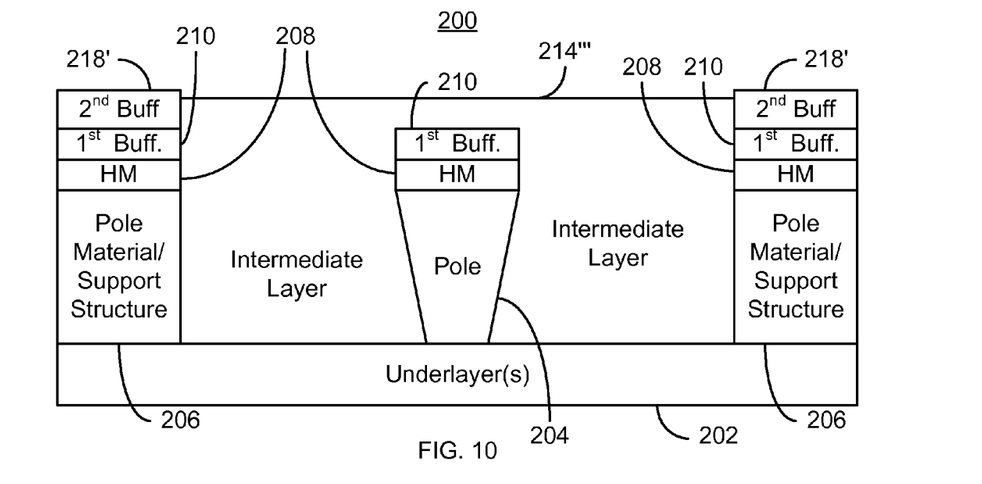

A second planarization is performed, via step 164. The second planarization terminates before the second planarization buffer layer 218' is completely removed. FIG. 10 depicts the PMR transducer 200 after step 164 has been performed. Thus, the top surface of the intermediate layer 214''' for the PMR transducer 200 is, again, substantially flat. In the embodiment shown in FIG. 10, the top of the second buffer layer 218' is slightly above the top of the intermediate layer 214'''. This is because the second buffer layer 218' is polished away more slowly than the intermediate layer 214'''.

Figure 11:
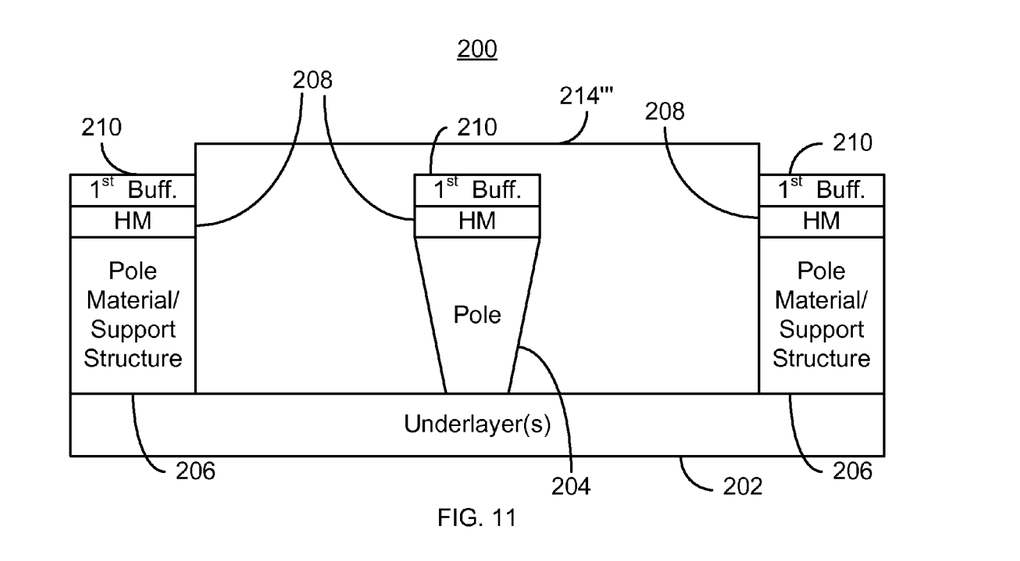

The remaining portion of the second planarization buffer layer 218' is removed in step 166. In one embodiment, step 166 includes performing a RIE with the appropriate chemistry for removing the second planarization buffer layer 218'. FIG. 11 depicts the PMR transducer 200 after step 166 is performed. Thus, the intermediate layer 214''' of the transducer around the PMR pole 204 may again protrude slightly. However, the protrusion is less than after step 160.

Figure 12:
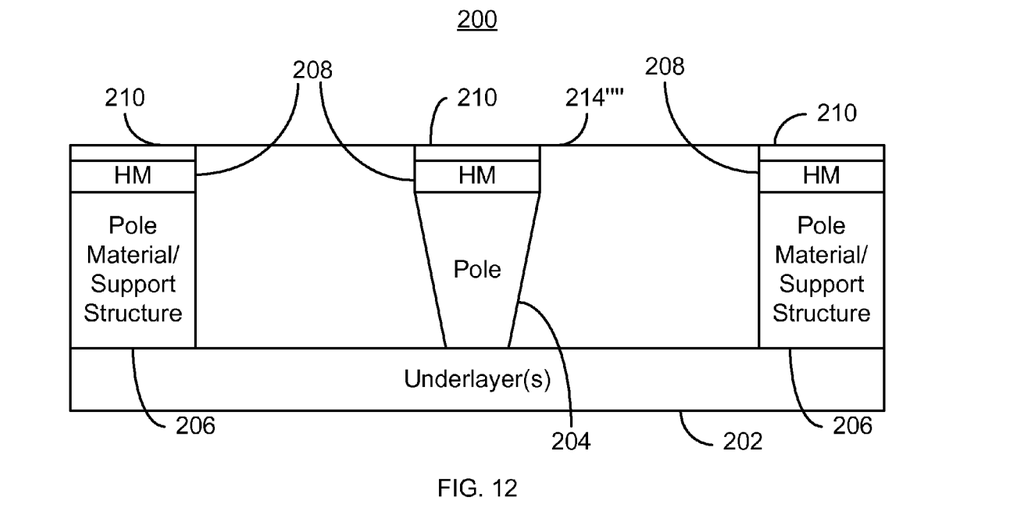

A third CMP is performed, via step 168. The third planarization terminates after the first planarization buffer layer 210 is exposed and before the first planarization buffer layer 210 is completely removed. A touch planarization may thus be used in step 168. Stated differently, the third planarization may be short in duration, use a dilute slurry, and/or a lower pressure. FIG. 12 depicts the PMR transducer 200 after step 168 is performed. The first planarization buffer layer 210 is thinner than the second planarization buffer layer 218'. Thus, the third planarization may be designed to remove only a small portion of the intermediate layer 214". The tops surface of the intermediate layer 214''' is thus at substantially the same height as the remaining portion of the first planarization buffer layer 210. Fabrication of the PMR transducer 200 may then be completed. For example, a top shield (not shown), which may be desired to be flat or controllable, may be provided Using the method 150, the PMR transducer 200 having a flat top surface may be formed around the structure. The variations in the top surface may be reduced over that of the conventional method 10 described in FIG. 1. Better control of the topology of the transducer, as well as subsequent structures, may thus be achieved. Yield may likewise be improved. Further, the process of planarizations using progressively thinner planarization buffer layers may be extended to more buffer layers and/or more planarizations. Consequently, further uniformity may be achieved.

We claim:

1. A method for providing a structure in a magnetic transducer having an additional structure distal from the structure, a first planarization buffer layer, and an intermediate layer, a first portion of the first planarization buffer layer residing on the structure, a second portion of the first planarization buffer layer residing on the additional structure, a first portion of the intermediate layer residing in a region of the magnetic transducer between the structure and the additional structure, a second portion of the intermediate layer residing above the structure, the method comprising:
performing a first planarization, the first planarization exposing a top surface of the magnetic transducer and terminating before a portion of the first planarization buffer layer is removed;
providing a second planarization buffer layer having a top and residing above the first planarization buffer layer, the second planarization buffer layer being provided after the step of performing the first planarization;
performing a second planarization, the second planarization terminating before the second planarization buffer layer is completely removed; and
performing a third planarization terminating after the first planarization buffer layer is exposed and before the first planarization buffer layer is completely removed.

2. The method of claim 1 further comprising:
providing a mask covering a portion of the magnetic transducer including the structure and having a mask bottom residing on the portion of the top surface of the magnetic transducer, the step of providing the mask being after the step of performing the first planarization and before the step of providing the second planarization buffer layer; and
etching an exposed portion of the magnetic transducer without removing the first planarization buffer layer and before the step of providing the second planarization buffer layer.

3. The method of claim 2 further comprising:
removing a remaining portion of the second planarization buffer layer after the second planarization is terminated substantially without removing any portion of the first planarization buffer layer.

4. The method of claim 3 further comprising:
providing a third planarization buffer layer having a third planarization buffer layer top residing below the top of the second planarization buffer layer; and
performing a fourth planarization before the step of performing the third planarization, the fourth planarization terminating before the third planarization buffer layer is completely removed.

5. The method of claim 4 wherein the step of removing the remaining portion of the second planarization buffer layer further includes:
performing a reactive ion etch using a first chemistry, the first planarization buffer layer being removable by another reactive ion etch using a second chemistry different from the first chemistry.

6. The method of claim 2 wherein the intermediate layer includes aluminum oxide.

7. The method of claim 2 wherein the first planarization buffer layer includes at least one of silicon carbide, Ru, Cr, Ta, and diamond-like carbon.

8. The method of claim 2 wherein the second planarization buffer layer includes at least one of silicon carbide, Ru, Cr, Ta, and diamond-like carbon and is different from the first planarization buffer layer.

9. The method of claim 2 wherein the first planarization buffer layer has a first thickness, the second planarization buffer layer has a second thickness, the intermediate layer has a third thickness, the third thickness being greater than the second thickness, and the second thickness being greater than the first thickness.

10. The method of claim 2 wherein the structure is a perpendicular magnetic recording pole.

11. The method of claim 2 wherein the additional structure is a support structure.

12. The method of claim 2 wherein the first planarization is a chemical mechanical planarization.

13. The method of claim 2 wherein the second planarization is a chemical mechanical planarization.

14. The method of claim 2 wherein the first planarization buffer layer has a thickness of not more than fifty nanometers.

15. The method of claim 2 wherein the second planarization buffer layer has a thickness of at least fifty and not more than one hundred fifty nanometers.

16. A method for providing a perpendicular magnetic recording (PMR) pole in a magnetic transducer having a support structure distal from the PMR pole, and a first chemical mechanical planarization (CMP) buffer layer, a first portion of the first (CMP) buffer layer residing on the PMR pole, a second portion of the first (CMP) buffer layer residing on the support structure, the method comprising:
providing a refill layer, a first portion of the refill layer residing in a region of the magnetic transducer between the PMR pole and the support structure, a second portion of the refill layer residing above the structure;
performing a first CMP terminating above the first CMP buffer layer, the first CMP buffer layer including silicon carbide and having a thickness of not more than fifty nanometers;
providing a mask covering a portion of the magnetic transducer including the PMR pole without covering an exposed portion of the magnetic transducer including the support structure;
removing a remaining portion of the refill layer not covered by the mask to expose the second portion of the first CMP buffer layer;
providing a second CMP buffer layer on the first CMP buffer layer, the second CMP buffer layer including diamond-like carbon and having a thickness of at least fifty nanometers and not more than one hundred fifty nanometers;
performing a second CMP, the second CMP terminating before the second CMP buffer layer is completely removed;
reactive ion etching the transducer to remove a remaining portion of the second CMP buffer layer; and
performing a third CMP, the third CMP terminating after the first CMP buffer layer is exposed and before the first CMP buffer layer is completely removed.

* * * * *